Patented Aug. 10, 1926.

1,595,143

UNITED STATES PATENT OFFICE.

GILBERT E. DOAN, OF CLEVELAND, OHIO.

WELDING ROD AND PROCESS OF WELDING.

No Drawing.   Application filed October 10, 1921. Serial No. 506,905.

This invention relates to the art of welding metallic articles by the electric arc. In particular, it pertains to a process of and means for making highly ductile welds between steel rail ends and plates.

One object of the invention is to provide a new and improved process of introducing metallic elements or compounds into molten weld metal formed by the electric arc.

Another object is to provide a process of arc welding metallic articles whereby highly ductile weld metal is obtained.

Another object is to provide an effective means of introducing ductilizing constituents into the weld metal melted in the arc welding process.

Another object is to provide a rod of a new and improved composition particularly suited to the process of arc welding iron or steel articles.

Other objects more or less ancillary to the above objects will be pointed out in the appended specification.

When metallic articles are welded by the electric arc process, certain constituents of the articles are "burned out" by the arc or otherwise prevented from appearing in the solidifying weld metal, with the result that the final weld metal may possess physical properties totally unlike those of the articles being welded and quite unsuited to the demands made upon it. For instance, in welding a fish plate to a steel rail, the arc tends to burn carbon and manganese out of the metal melted thereby which may therefore be left in an undesirable condition.

I have discovered, however, that such undesirable conditions can be compensated for, and that certain metallic constituents can be introduced into the molten weld metal in predetermined amounts which will have the effect of controlling, over a wide range, the physical properties of the weld metal. For example, by my process it is possible to obtain strong and ductile weld metal between a steel rail and fish plate by introducing into the molten weld metal certain predetermined percentages of elements or compounds, such as manganese, silicon, aluminum, vanadium, magnesium, calcium and sodium which have a ductilizing effect thereon.

The steps of my process and the means by which it is carried out will now, for purposes of illustration, be described as practiced in the well-known carbon arc process of welding a steel fish plate to a steel railway rail, altho obviously it is capable of application to various metals and metallic elements.

After the plate and rail have been suitably assembled and secured together, and made ready for welding, an iron rod of a special composition which I have invented, and which may be round, square or of other desired cross-sectional configuration, is positioned closely adjacent the junction of the plate and rail. The composition of this rod is important. It should consist principally of iron, but may contain small amounts of carbon, and should include a sufficient amount of the particular ductilizing element selected to produce the desired ductility in the weld metal. When manganese is the element used the rod may contain from about .01% to .10% of carbon and between .30% and 3.00% of manganese. Rods containing about .10% of carbon and upwards of 1.00% of manganese have been found to produce highly ductile welds when employed with steel rails containing about .80% carbon and about .50% manganese.

With the rod in position an arc is struck between a carbon electrode and the rail and plate, the metal of the rod, the rail and the plate being melted thereby and all combining to constitute molten weld metal which solidifies as the arc passes along the rail. The proportion and amounts of the various constituents of the rail, the plate and the rod in the weld metal depends partly upon the amounts thereof in the separate members prior to melting and partly on the action of the arc upon the constituents. By reason of the molten condition of the weld metal and its agitation by the arc the various metallic constituents of the rod become thoroly and uniformly mixed in the molten weld metal with constituents of the rail and plate. When constituents, having a ductilizing influence on iron, such as manganese, are present in the rod they pass directly into and are absorbed by the weld metal except in so far as they may be "burned out" or vaporized by the arc. Altho manganese tends to burn out of the rail, plate and rod at the high temperature of the electric arc, the extent of such loss may be easily determined by experiment. Any excess of manganese in the rod over the amount which it has been found will burn out in practice, will enter and remain in the weld metal. In this manner it is possible to introduce a predetermined amount of a metallic element directly into the molten weld metal and thereby to control accurately the composition and physical properties of such metal.

I am aware that it has been proposed to utilize an iron electrode containing carbon and manganese to introduce manganese into the weld metal. My process, however, differs materially from such process in that the rod is positioned in contact with the articles to be welded and when melted, intermingles with and unites directly with the molten parts thereof.

The weld metal obtained in the metal electrode process is obtained almost entirely from the electrode and the properties of a weld produced by this process are thus almost completely controlled by consideration of the electrode alone; whereas in the carbon electrode process the weld is commonly composed of as much as 50 per cent parent or plate and rail metal, the composition of which weld metal must be compensated for by special consideration of both the action of the electrode and arc thereupon.

I am also aware that a certain composition of electrode somewhat similar to my improved composition has been specified for use in the metal electrode process and do not claim such composition, my invention residing in a composition exceptionally low in carbon and correspondingly high in manganese or any one or more of the above mentioned elements, such composition, however, being valuable either as an electrode or filler rod.

From the foregoing description it is obvious that I have provided a process and means of introducing various metallic elements and compounds into weld metal and of varying correspondingly the composition of the weld metal. I, therefore, do not wish to have any invention limited to the specific example given, since its scope is defined by what is claimed.

What is claimed is:

1. As a new article of manufacture, an iron rod for use in electric welding containing manganese up to 3.00% and total carbon less than .15%.

2. The process of forming ductile arc welded joints between steel articles which comprises melting an iron rod containing manganese up to 3.00% and total carbon of .15% adjacent the weld metal and causing the manganese to enter the molten weld metal in predetermined amounts.

In testimony whereof I affix my signature.

GILBERT E. DOAN.